JOHN NAGY JR.
INVENTOR.

July 21, 1959  J. NAGY, JR  2,896,154
METHOD AND APPARATUS FOR MEASURING THE
TRANSCONDUCTANCE OF AN ELECTRON TUBE
Filed Oct. 18, 1954  2 Sheets-Sheet 2

JOHN NAGY JR.
INVENTOR.

BY
Rudolph J. Junick
ATTORNEY

United States Patent Office 2,896,154
Patented July 21, 1959

2,896,154

METHOD AND APPARATUS FOR MEASURING THE TRANSCONDUCTANCE OF AN ELECTRON TUBE

John Nagy, Jr., Newark, N.J., assignor, by mesne assignments, to Daystrom, Incorporated, Murray Hill, N.J., a corporation of New Jersey Application October 18, 1954, Serial No. 462,719

7 Claims. (Cl. 324—27)

This invention relates to a tube tester and more particularly to novel apparatus and method for measuring the transconductance of a vacuum tube independent of other tube parameters.

Numerous circuits and apparatus are presently available for obtaining the transconductance of a vacuum tube. Generally, such apparatus utilizes a bridge network requiring a null balance and, therefore, is not of the direct reading type. Further, and more importantly, in prior apparatus of this class, vacuum tubes having a low amplification factor require that the value of the tube amplification factor be known so that an appropriate correction factor can be introduced into the test circuit. Such correction factor usually takes the form of an added resistance in the circuit of the indicating meter thereby resulting in a poor regulation of the plate voltage. Additionally, in a practical form of tube tester, precise compensation for all tubes having a low amplification factor could not be achieved because of the corresponding changes brought about in the scale distribution of the indicating instrument. Consequently, compromise scales are employed which best approximate the average scale distribution characteristics at selected instrument ranges whereby fixed errors as high as 5 percent may be encountered even with the best available settings of the amplification factor correction means.

A vacuum tube tester made in accordance with my invention affords the advantages of simple and direct measurement of transconductance between two electrodes of an electron tube without the use of bridge networks, null balances or amplification factor corrections. Further, my circuit allows the use of a low input impedance vacuum tube voltmeter having a wire wound input potentiometer for adjustment of sensitivity. A simple method of changing the range of the indicating instrument is also provided, specifically by means of a resistance voltage divider and a suitable switch. The resultant accuracy of the apparatus depends upon the accuracy of a wire wound resistor, the accuracy of balance between two identical windings on a transformer and on the accuracy of scale distribution and reading error of an alternating current voltmeter, all of which factors can be closely controlled to provide a high overall accuracy of the apparatus as a whole.

My novel method for measuring the transconductance of a vacuum tube consists of energizing the tube electrodes at normal voltages, introducing a signal into, say, the plate circuit of the tube and measuring the resultant voltage between the plate and cathode by a vacuum tube voltmeter, adjusting the gain of the vacuum tube voltmeter amplifier so that the pointer of the associated indicating instrument is alined with a reference mark on the scale. This single adjustment compensates for line voltage variations, the temperature coefficient of the rectifier type indicating meter and any long term drift in the amplifier. It also compensates for voltmeter input impedance and for the plate resistance of the tube under test. The next step consists of removing the plate signal and introducing a related signal into the grid circuit, that is, a grid signal as an exact multiple or submultiple of the plate signal according to the measurement range desired. The vacuum tube voltmeter at all times remains connected to the plate resistor and when the grid signal is introduced the reading on the meter is proportional to the transconductance of the tube under test, with the constant of proportionality determined by the plate load resistor and the ratio of the grid and plate signal voltages.

An object of this invention is the provision of apparatus and a method for measuring the transconductance between two electrodes of a vacuum tube.

An object of this invention is the provision of novel apparatus for the measurement of the transconductance of a vacuum tube independent of other tube parameters.

An object of this invention is the provision of apparatus for measuring the transconductance of an electron tube, said apparatus comprising means to maintain the tube grid electrode and the tube plate electrode energized at normal voltage levels, a first source of alternating current voltage of known value, means operable to impress the voltage of the said first source upon a circuit that includes one of the said tube electrodes, an indicating instrument responsive to the resulting alternating current voltage between the cathode and the said one electrode, said instrument having a pointer movable relative to a scale calibrated in values of transconductance, means to vary the current flowing through the meter to align the pointer with a reference mark on the scale, a second source of alternating current voltage having a known value, and means operable to remove the voltage of said first source from the stated circuit and to impress the voltage of the second said source upon the circuit that includes the other said tube electrode, the transconductance of the tube now being indicated by the position of the pointer relative to the scale.

An object of this invention is the provision of apparatus for measuring the transconductance of a vacuum tube comprising means energizing the tube electrodes at normal levels, a vacuum tube voltmeter responsive to the voltage drop across a resistor in the plate circuit of the tube under test, means to introduce an alternating current signal into the plate circuit of the tube, means to adjust the gain of the vacuum tube voltmeter so that the pointer of the associated indicating meter registers with a selected mark on the scale, and means to remove the plate signal and to introduce a related alternating current signal on the grid of the tube under test, the transconductance of the tube then being read directly from the position of said pointer relative to calibration markings on said scale.

An object of this invention is the provision of a method for determining the transconductance of an electron tube, which method comprises maintaining normal voltages on the tube plate electrode and on tube grid electrode, impressing a known alternating current signal into a first circuit that includes one of the said tube electrodes, and obtaining the A.-C. voltage across the cathode and the said one electrode, removing the signal from the said first circuit and applying a related alternating current signal into a second circuit that includes the other said tube electrode, and again obtaining the resultant A.-C. voltage across the cathode and said one electrode, the ratio of the two said resultant currents being indicative of the transconductance of the tube.

These and other objects and advantages will become apparent from the following description when taken with the accompanying drawings. It will be understood the drawings are for purposes of illustration and are not to be construed as defining the scope or limits of the invention, reference being had for the latter purpose to the appended claims.

In the drawings wherein like reference characters denote like parts in the several views.

Figure 1:
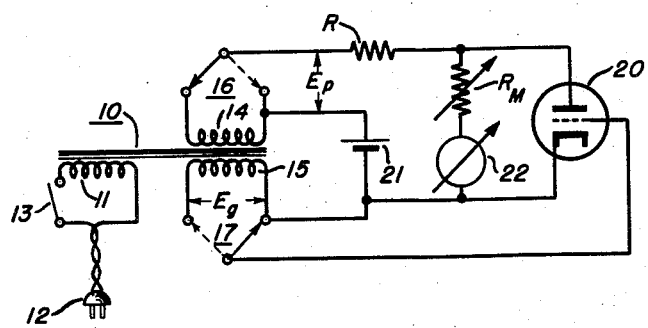
Figure 1 is a diagram of my basic circuit for the direct measurement of the transconductance of a vacuum tube.

Reference is made to Figure 1 wherein I show a transformer 10 having a primary winding 11 that is energized by a conventional 120 volt power source through a plug connector 12 upon closure of the line switch 13. The transformer is provided with two identical but electrically isolated secondary windings 14, 15, which are connected to the stationary contacts of the respective single-pole, double-throw switches 16, 17. These switches permit the selective introduction of signals into the plate and grid circuits of the vacuum tube 20. It will be noted that when the movable contact of the switch 16 is thrown to the right, as shown by the dotted line, the biasing battery 21 is connected between the tube cathode and plate, through the resistor R. However, when the movable blade is thrown to the left, an A.-C. signal, $E_p$ (the voltage of the secondary winding 14), is superimposed into the plate circuit. Similarly, when the movable blade of the switch 17 is in the illustrated position the tube grid is tied directly to the cathode whereas when the movable blade is thrown to the left (as shown by the dotted lines) an A.-C. signal, $E_g$ (the voltage of the secondary winding 15), is impressed between the cathode and grid. In either case, the voltage across the cathode-plate is indicated or measured by a vacuum tube voltmeter here generally identified by the numeral 22.

Figure 2:
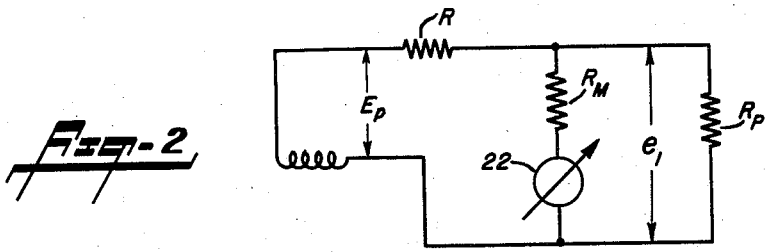
Figure 2 is a diagram of the equivalent circuit with the alternating current signal applied to the plate of the tube under test.

Reference is now made to Figure 2 which is the equivalent of the Figure 1 circuit with the switches 16 and 17 set as shown by the solid lines. If the plate resistance of the tube is represented by $R_p$, then the voltage measured by the meter 22 is;

$$e_1 = E_p \frac{R_m R_p}{R_m R_p + R R_p + R R_m} \quad (1)$$

Figure 3:
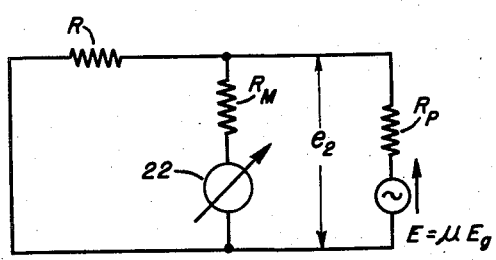
Figure 3 is a diagram of the equivalent circuit when the alternating current signal is removed from the plate and an equivalent signal is applied to the grid of the tube under test.

Reference is now made to Figure 3 which is the equivalent of the Figure 1 circuit when the switches 16 and 17 are set as shown by the dotted lines, i.e., with the A.-C. signal removed from the plate and an equivalent A.-C. signal applied to the grid. Now the voltage measured by the meter 22 is;

$$e_2 = \mu E_g \frac{R R_m}{R_m R_p + R R_p + R R_m} \quad (2)$$

The ratio of the two voltage readings, therefore, is $$\frac{e_2}{e_1} = \frac{\mu E_g}{E_p} \cdot \frac{R}{R_p} = \frac{\mu}{R_p} \cdot \frac{E_g}{E_p} \cdot R$$

$$= gm \frac{E_g}{E_p} R$$

Therefore, the transconductance, $gm$, is;

$$gm = \frac{1}{R} \cdot \frac{E_p}{E_g} \cdot \frac{e_2}{e_1} \quad (3)$$

If the ratio of $E_p/E_g$ is fixed by the turns ratio of the transformer secondary windings and the value of $R_m$ is adjusted so that the meter 22 reads the top scale mark with the voltage $E_p$ applied, then, $$gm = K e_2$$

where, $$K = \frac{1}{R} \cdot \frac{E_p}{E_g}$$

With the A.-C. signal applied to the plate and no signal on the grid, the single adjustment of the resistor $R_m$ to provide a top scale mark indication on the meter 22 compensates for line voltage variations, for temperature variations of the meter 22 (which generally is a rectifier type meter), for any long term drift of the amplifier associated with the meter, for the input impedance of the meter, and for the plate resistance of the tube 20. Hence, the circuit is completely conditioned for the direct measurement of the transconductance of the tube. This is done by removing the plate signal and applying an equivalent signal to the grid whereby the reading of the meter is directly proportional to tube transconductance.

In a practical embodiment of my invention the switches 16 and 17 are combined in a single double-pole, double-throw switch, the circuit-adjusting resistor $R_m$ is made adjustable and the value of the plate load resistor R and the voltage ratio of the transformer secondary windings is selectively adjustable in order to provide a desired range of indications of the meter 22.

Figure 4:
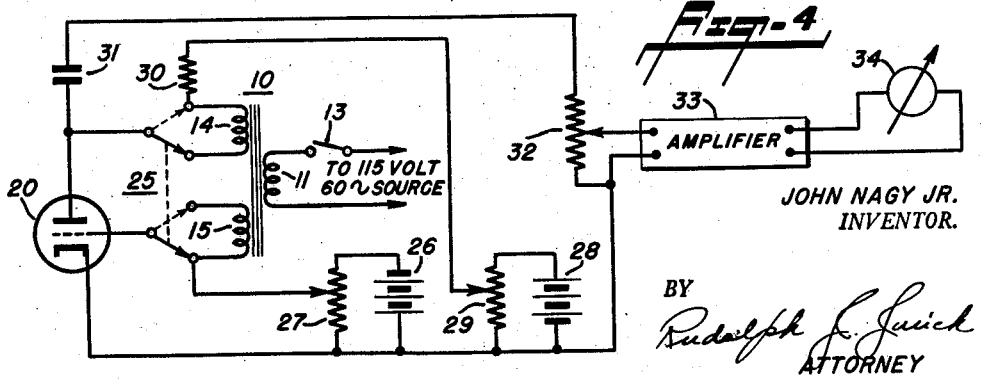
Figure 4 is a circuit diagram of a tube tester made in accordance with my invention.

A circuit diagram of a tube tester made in accordance with my invention is shown in Figure 4. Here, however, the circuitry is restricted to that required for the testing of a single type vacuum tube. Those skilled in this art will understand that the complete tube tester will include a plurality of sockets for accepting tubes having different tube bases, circuit connections and switching arrangement for properly energizing the tube electrodes, at rated voltage levels, and various adjustable means to condition the apparatus for the precise testing of any one of the numerous types of tubes presently available, etc.

As shown in Figure 4, the double-pole, double-throw switch 25 serves to alternately connect the transformer secondary windings 14 and 15 into the plate and grid circuits of the tube 20 that is under test. The normal grid biasing potential is supplied by the battery 26 through the potentiometer 27 and the plate is biased by the battery 28 through the potentiometer 29 and the plate resistor 30. With the grid and plate so energized at normal voltage levels and with the switch 25 set as shown, a known A.-C. signal furnished by the winding 14 is impressed between the tube plate and cathode. The resulting alternating current component is passed by the blocking condenser 31 and develops a voltage drop across the potentiometer 32. A selected portion of the voltage drop across the potentiometer 32 is applied to the input of the amplifier 33, said amplifier having a low impedance output. An indicating meter 34, preferably of the rectifier type, is connected in the output of the amplifier. It may here be pointed out that minor variations due to aging of the electronic components do not affect the scale distribution of the meter. The gain of the amplifier is adjusted until the pointer of the meter registers with the top mark on the associated scale, said scale being calibrated directly in terms of transconductance. As explained hereinabove, such initial adjustment of the current flowing in the measuring instrument compensates for all variable factors such as line voltage variations, temperature variations of the meter, amplifier drift, input impedance of the meter and also for the plate resistance of the tube 20 under test. Consequently, the circuit is now conditioned for the direct and accurate measurement of the tube transconductance. This is done by setting the switch 25 to the dotted line position whereby the A.-C. signal is removed from the plate circuit and an equivalent A.-C. signal is imposed upon the grid circuit. The transconductance of the tube is now directly indicated by the position of the meter pointer with respect to the scale.

Figure 5:
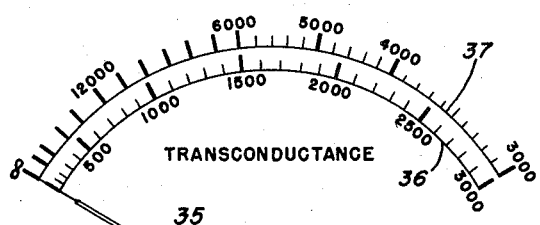
Figure 5 illustrates representative, calibrated scales associated with the pointer of the indicating instrument.

Figure 5 illustrates the pointer 35 of the indicating instrument cooperating with two calibrated scales 36, 37. The lower scale 36, having a zero mark at the left, is the one which is used with the circuit and test procedure just described. With no current flowing through the movable coil of the instrument the pointer will be aligned with the zero scale mark. With the A.-C. signal applied to the plate circuit of the tube under test, the gain of the amplifier is adjusted until the pointer is aligned with the top scale mark, 3000. Since the circuit is conditioned for a maximum flow of current through the indicating meter and since the transconductance of the tube, in this particular test method, varies inversely with the resistance in the plate circuit (as indicated by the formulae given above), it is apparent that the top mark of the scale 36 should correspond to the maximum value of transconductance to be measured within the angular deflection range of the instrument. However, the scale range of the instrument can be changed in numerous ways as shown in the diagrams of Figures 6 and 7 wherein the components common to those of Figure 4 are identified by similar reference numerals.

Figure 6:
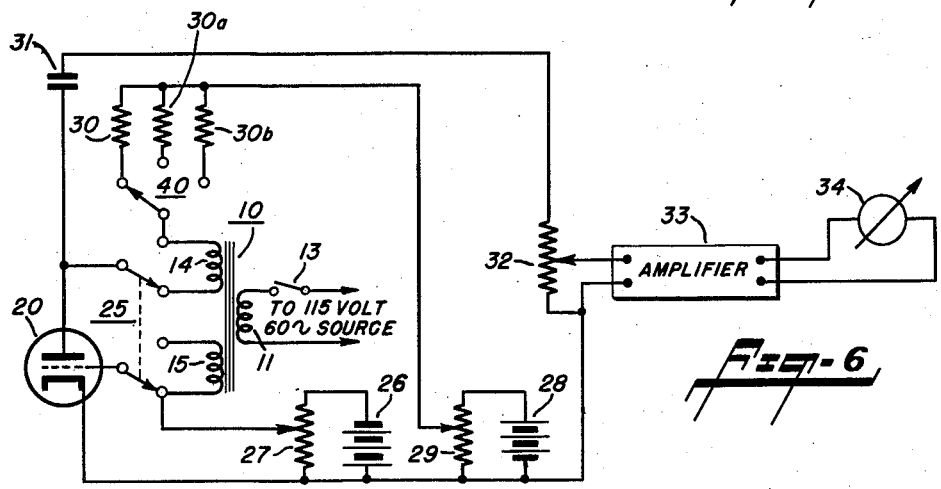
Figure 6 is a circuit diagram illustrating one means for selectively changing the range of the indicating instrument.

Figure 6 shows a method of changing the range of the indicating instrument by changing the load in the plate circuit of the tube 20 under test. Here a selected one of the resistors 30, 30a and 30b are connected into the plate circuit by means of a switch 40, said switch being provided with suitable markings indicating the factor by which the actual scale markings are to be multiplied. Alternatively, the indicating meter may be provided with a plurality of scales, each corresponding to a given range established by the individual plate resistors.

Figure 7:
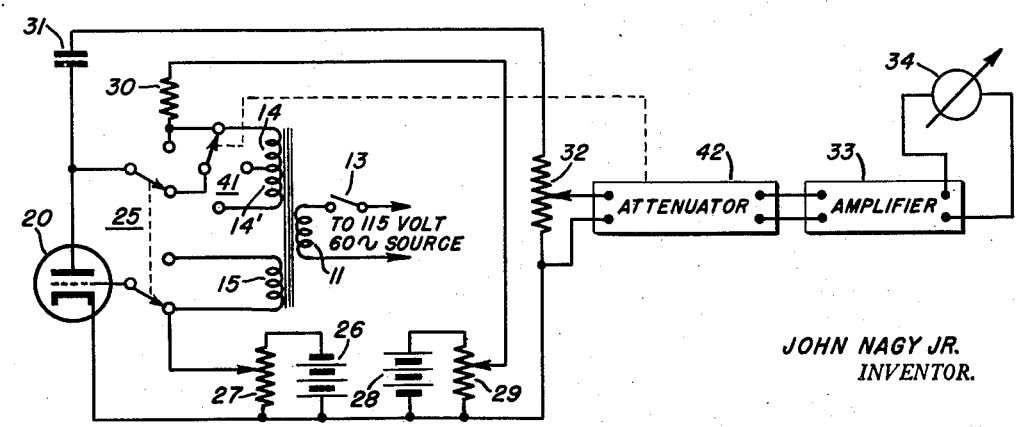
Figure 7 is a circuit diagram showing another means for changing the range of the indicating instrument.

Figure 7 illustrates a method of changing the range of the indicating instrument by changing the voltage of the A.-C. signal applied to the plate of the tube 20 under test. With the switch 25 set in the illustrated position, one or the other of the transformer secondary windings 14, 14' are connected into the tube plate circuit by an appropriate setting of the switch 41. The voltages of these windings 14, 14' bear a definite, known relation to each other and to the voltage of the winding 15 and the switch 41 may carry markings indicating the multiplying factor to be applied to the actual scale calibrations of the indicating instrument. In this method of range changing the movable arm of the switch 41 is mechanically coupled to a suitable attenuator 42 whereby the input level to the amplifier 33 is kept constant for all positions of the switch 41.

Those skilled in this art will understand that numerous other arrangements may be utilized for the purpose of changing the range of the indicating instrument. For example, the A.-C. signal applied to the grid of the tube under test may be varied in discrete, known steps by providing a tapped winding and switch similar to that shown in Figure 7 for the plate circuit. Further, in place of such tapped transformer secondary coils the single windings 14 and 15 of Figure 4, may be associated with resistive voltage dividers to apply known fractions of one or both voltage signals to the plate and/or the grid.

In the above description of my invention, I have presented a method and means for measuring the transconductance of a tube by energizing the tube electrodes at normal voltage levels, inserting a known A.-C. signal into the plate circuit adjusting the circuit to provide a reference top mark indication on a meter having a calibrated scale, removing the A.-C. signal from the plate circuit and applying an equivalent signal to the tube grid, whereby the meter will indicate the value of the tube transconductance. In such arrangement the scale of the indicating meter will take the form illustrated in Figure 5 and identified by the numeral 36, that is, increasing values of transconductance result in an increasing deflection of the meter pointer. It will be apparent, however, that the range of measurement of the transconductance factor can be extended by reversing this procedure, that is, by introducing the A.-C. signal first to the grid of the tube under test, adjusting the gain of the amplifier to provide a full scale deflection of the pointer of this indicating meter and then applying an equivalent signal to the plate for the measurement of transconductance. In this case the calibrated scale of the indicating meter will be reversed as shown by the upper scale 37 in Figure 5. More specifically, the meter indication will be an inverse function so that with no deflection of the meter pointer the transconductance reading is infinite and with increasing pointer deflections the transconductance reading will be smaller. This may be seen from Equation 3, above; namely, $$gm = \frac{1}{R} \cdot \frac{E_p}{E_g} \cdot \frac{e_2}{e_1}$$

If the ratio $E_p/E_g$ is fixed by the turns ratio of the transformer secondary windings, and if $R_m$ (see Figure 1) is adjusted for the top mark on the indicating meter scale with the voltage E applied to the grid, then $$gm = K \cdot \frac{1}{e_1}$$

where $$K = \frac{1}{R} \cdot \frac{E_p}{E_g}$$

While the above description has been limited to a method and apparatus for determining the transconductance between the grid and plate electrodes of an electron tube it will be apparent that the same procedure and apparatus is suitable for the measurement of the transconductance factor between any two electrodes of the tube.

Having now described my invention in detail, in accordance with the patent statutes, various changes and modifications will suggest themselves to those skilled in this art and it is intended that such changes and modifications shall fall within the spirit and scope of the invention as recited in the following claims.

I claim:

1. Apparatus for the direct measurement of the transconductance of an electron tube, said apparatus comprising means energizing the electrodes of the tube at rated D.-C. voltages; a load resistor connected to the plate of the tube, an indicating instrument connected directly across the tube plate and cathode said instrument having a pointer movable over a scale calibrated in transconductance values; a source of two alternating voltages of known relative magnitudes; means operable to one position to impress the first alternating voltage across a circuit including the cathode, plate and load resistor and to another position to impress the second alternating voltage across the cathode and grid; and electrical means adjustable to align the instrument pointer with a fixed reference mark on the scale.

2. Apparatus for the direct measurement of the transconductance of an electron tube, said apparatus comprising a plate-biasing source of D.-C. voltage having one terminal connected to the tube cathode; a grid-biasing source of D.-C. voltage having one terminal connected to the said cathode; a plate load resistor connected to the other side of the plate-biasing voltage; a first A.-C. voltage source of predetermined magnitude; a second A.-C. voltage source having a known magnitude relation to the said first A.-C. voltage source; switch means operable to a first position to connect the load resistor to the plate and to a second position to impress the voltage of the first A.-C. voltage source between the plate and the load resistor; a second switch operable to a first position to connect the other side of the grid-biasing voltage to the tube grid and to a second position to impress the voltage of the second A.-C. voltage source across the tube grid and cathode; indicating means having a pointer movable over a scale calibrated in transconductance values; circuit elements connecting the indicating means across the tube cathode and plate through a blocking capacitor; and means to align the said pointer with a fixed reference mark on the scale when one of said switches is in the said other position.

3. The invention as recited in claim 2, wherein the said indicating means is connected in the output circuit of an amplifier whose input circuit is connected between the cathode and plate through the blocking capacitor.

4. The invention as recited in claim 3, wherein the said first A.-C. voltage source has a plurality of discrete known magnitudes, a third switch operable to impress a selected magnitude of the first voltage source between the plate and load resistor when the said first switch is in the said other position, and means operated simultaneously with the said third switch to maintain a constant input level to the amplifier.

5. A method of determining tube transconductance, said method comprising maintaining rated D.-C. biasing voltages on the tube plate and grid, applying a known A.-C. signal to the plate through a plate load resistor and measuring the resulting A.-C. voltage appearing directly across the tube plate and cathode, removing the said A.-C. signal from the plate, applying a second A.-C. signal to the grid, said second signal being of predetermined magnitude relative to the first signal, and measuring the resulting A.-C. voltage now appearing directly across the tube plate and cathode, the ratio of the two resulting voltages being taken as the transconductance of the tube.

6. A method of determining the transconductance of an electron tube which method comprises maintaining rated D.-C. biasing voltages on the tube plate and grid; applying a first A.-C. signal of known magnitude to the plate through a plate load resistor and measuring the resulting A.-C. voltage appearing directly across the tube plate and cathode; removing the said first A.-C. signal from the plate; applying a second A.-C. signal to the tube grid; said second signal having a predetermined voltage ratio relative to the first A.-C. signal; and measuring the resulting A.-C. voltage now appearing directly across the tube plate and cathode, the ratio of the two resulting voltages being taken as the transconductance of the tube.

7. A method of determining the transconductance of an electron tube which method comprises maintaining rated D.-C. biasing voltages on the tube plate and grid, applying a first A.-C. signal of known magnitude to the grid and measuring the resulting A.-C. voltage appearing directly across the tube plate and cathode; removing the A.-C. signal from the grid; applying a second A.-C. signal to the tube plate through a plate load resistor, said second signal having a predetermined voltage ratio relative to the first signal; and measuring the resulting A.-C. voltage now appearing directly across the tube plate and cathode, the ratio of the two resulting voltages being taken as the transconductance of the tube.

References Cited in the file of this patent

UNITED STATES PATENTS

| | | |
|---|---|---|
| 1,689,871 | Goodwin | Oct. 30, 1928 |
| 2,083,357 | Barton | June 8, 1937 |
| 2,463,004 | Sunstein | Mar. 1, 1949 |
| 2,790,139 | Winther | Apr. 23, 1957 |